United States Patent
Heise

(10) Patent No.: US 7,139,310 B2
(45) Date of Patent: Nov. 21, 2006

(54) METHOD FOR TRANSMITTING DATA STREAMS, AND WARM START SEQUENCE FOR S(H)DSL TRANSMISSION/RECEPTION DEVICES

(75) Inventor: Bernd Heise, Munich (DE)

(73) Assignee: Infineon Technologies AG, Munich (DE)

( * ) Notice: Subject to any disclaimer, the term of this patent is extended or adjusted under 35 U.S.C. 154(b) by 675 days.

(21) Appl. No.: 10/208,511

(22) Filed: Jul. 30, 2002

(65) Prior Publication Data

US 2003/0048384 A1 Mar. 13, 2003

(30) Foreign Application Priority Data

Aug. 3, 2001 (DE) ............................... 101 39 779

(51) Int. Cl.
*H04B 1/38* (2006.01)
*H04L 5/16* (2006.01)
*H04L 27/00* (2006.01)

(52) U.S. Cl. ..................................... 375/222; 375/259

(58) Field of Classification Search ................ 375/219, 375/141, 222, 259; 455/73, 91
See application file for complete search history.

(56) References Cited

U.S. PATENT DOCUMENTS

| | | | |
|---|---|---|---|
| 5,450,457 A | * | 9/1995 | Ito et al. ...................... 375/355 |
| 5,631,952 A | | 5/1997 | O'Barr et al. |
| 5,852,630 A | * | 12/1998 | Langberg et al. ............ 375/219 |
| 6,240,180 B1 | * | 5/2001 | Younce et al. ......... 379/406.09 |
| 6,690,655 B1 | * | 2/2004 | Miner et al. ................. 370/278 |
| 6,839,889 B1 | * | 1/2005 | Liu .............................. 716/18 |

OTHER PUBLICATIONS

ITU-T Standard G.992.2, "Splitterless asymmetric digital subscriber line 9ADSL) transceivers," ( Jun. 6, 1999).
ITU-T Standard G.994.1, "Handshake procedures for digital subscriber line (DSL) transceivers," ( Jun. 6, 1999).

* cited by examiner

*Primary Examiner*—Mohammed Ghayour
*Assistant Examiner*—Aslan Ettehadieh
(74) *Attorney, Agent, or Firm*—Jenkins, Wilson, Taylor & Hunt, P.A.

(57) ABSTRACT

The invention relates to a method for transmitting data streams where transmission/reception devices (LTU, NTU) deactivated to a standby state are activated by performing a warm start sequence, with transmission line parameters being determined (S103) using an exchange-end transmission/reception device (LTU) following provision of a subscriber-end transmitted signal, transmission line parameters being determined (S104) using a subscriber-end transmission/reception device (NTU) following provision of an exchange-end transmitted signal, echo cancelation being realigned (S105) using a subscriber-end transmission/reception device (NTU) following provision of a subscriber-end transmitted signal, and/or echo cancelation being realigned (S106) using an exchange-end transmission/reception device (LTU) following provision of an exchange-end transmitted signal.

1 Claim, 3 Drawing Sheets

METHOD FOR TRANSMITTING DATA STREAMS, AND WARM START SEQUENCE FOR S(H)DSL TRANSMISSION/RECEPTION DEVICES

TECHNICAL FIELD

The present invention relates to a method and to an apparatus for transmitting data streams, and relates in particular to a method for transmitting data streams where transmission/reception devices deactivated to a standby state are activated by performing a warm start sequence.

BACKGROUND ART

With transmission methods using copper lines, there is the problem of transferring exchange-end transmission/reception devices and subscriber-end transmission/reception devices connected via at least one data transmission path from a deactivated state or from a standby state to an activated state, this operation being referred to below as a "warm start".

xDSL technologies involve various types of use/carrier methods for line-conducted data stream transmission from an exchange to a subscriber end.

By way of example, the following DSL (DSL=Digital Subscriber Line) methods are used:
 (i) ADSL: asymmetric DSL,
 (ii) VDSL: Very High Data Rate DSL,
 (iii) SDSL: Symmetrical Single Pair DSL (DSL with a symmetrical single pair line), and
 (iv) S(H)DSL: (SDSL at a high data rate).

These transmission methods using the at least one data transmission path are based on exchange-end transmission/reception devices and subscriber-end transmission/reception devices, the problem being that both transmission/reception devices need to be transferred to an energy saving mode, or need to be deactivated, for energy saving reasons.

To change from an energy saving mode or a standby mode to an operating mode, the deactivated transmission/reception devices need to be reactivated using a warm start sequence.

In this context, it can be assumed that a first warm start sequence has been preceded by a "cold start", where data transmission has been activated on a line.

The exchange-end transmission/reception devices and the subscriber-end transmission/reception devices adapt themselves in this case to the parameters or properties of the line in the data transmission path.

Disadvantageously, this operation typically takes at least 30 seconds, which means that a warm start, which comprises a warm start sequence and requires much shorter time periods for activation, is absolutely essential. In this context, all subsequent activation operations require that knowledge of the properties of the line in the data transmission path be put into practice in a fraction of the aforementioned time (30 seconds).

All of these activation operations are referred to as "warm starts". Internationally standardized warm start sequences exist for ISDN-U interfaces, for example, as described in the literature reference:

"ETSI TS 102 080, Integrated Services Digital Network (ISDN) basic rate access, Third Edition, November 1998" and in the literature reference:

"ANSI T1.601-1988, Integrated Services Digital Network (ISDN), ANSI, September 1988".

For xDSL, particularly for S(H)DSL methods, various methods are known which all have serious drawbacks for existing transmission/reception devices. Such methods are described in the literature references "Infineon, "SDSL Warm Start Capability", ETSI-Meeting TM6 Amsterdam, December 1999, 994t51a0";

"Adtran, "Warm Start Considerations", ETSI-Meeting TM6 Amsterdam, December 1999, 994t59a0"; "Infineon, Adtran, "SDSL Warm Start", Helsinki, May 2000, 002t25a1";

"Infineon "Warmstart Wake-up tones" ETSI-Meeting TM6 Vienna September 2000, 003t42a0";

"Conexant Systems "Warm start wake up signals" ETSI-Meeting TM6 Monterey, November 2000, 00t24a0";

"Conexant Systems "M-Sequence based line probe signals for both keep-alive and warmstart wake-up signals" ETSI-Meeting TM6 Sophia Antipolis, February 2001, 011t25a0"; and "Infineon, "warmstart-Sequence", ETSI-Meeting TM6 Ghent, May 2001"; "Infineon "Warmstart wake-up tones", Ghent, May 2001".

FIG. 3 shows a flowchart in block form to illustrate a method for transmitting data streams in accordance with the prior art. Following a start step S100, subscriber-end activation is effected in a subscriber-end activation step S101. The subscriber-end activation provokes exchange-end activation, which is performed in an exchange-end activation step. This is conventionally followed by subscriber-end synchronization (step S107) and finally exchange-end synchronization (step S108): after steps S101-S108, a data stream can be transmitted in a data stream transmission step S111. Following data stream transmission, the procedure is stopped (step S112).

A main drawback of conventional methods for transmitting data streams where transmission/reception devices can be deactivated to a standby state is that, before synchronization or before a specific warm start, a known far end signal needs to be provided in order to detect a change in the far end signal as a consequence of a change in properties of a line in the at least one data transmission path since activation last occurred.

By way of example, interference such as temperature fluctuations or changes in air humidity has a disadvantageous effect on line properties and can alter the line properties in an unforeseeable manner.

Another drawback of known methods is that transmission/reception devices are available which require a time period without a far end signal before synchronization, in order to adapt themselves to a change in an echo in their own transmitted signal, which is also caused, inter alia, by a change in line properties in the at least one data transmission path.

Disadvantageously, a fixed warm start sequence in the exchange-end transmission/reception devices and in the subscriber-end transmission/reception devices would mean a high level of complexity and would lengthen a warm start sequence unnecessarily, resulting not only in an increase in costs but also in a reduction in the specific advantages of a warm start.

SUMMARY OF THE INVENTION

It is therefore an object of the present invention to provide a method for transmitting data streams where transmission/reception devices deactivated to a standby state are activated by performing a warm start sequence which does not require a fixed procedure and/or makes no specific demands on the individual (exchange-end and/or subscriber-end) transmission/reception devices and thus avoids the drawbacks of methods based on the prior art.

The invention achieves this object by means of methods for transmitting data streams where transmission/reception devices (LTU, NTU) deactivated to a standby state are activated by performing a warm start sequence.

A fundamental concept of the invention is that of prescribably inserting at least one additional segment into a warm start sequence before synchronization is performed.

The invention provides four additional segments which can be inserted into a warm start sequence individually or in any combination, this being arranged either during a cold start activation operation or during the activation (cold start or warm start) at a respective previous time.

Specifically, these are
(i) an exchange-end transmission line determination step,
(ii) a subscriber-end transmission line determination step,
(iii) an exchange-end realignment step; and
(iv) a subscriber-end realignment step.

The aforementioned name "realignment step" relates to echo cancelation.

It is thus a primary advantage of the present invention that an extremely flexible warm start sequence can be provided.

Before a warm start sequence, a successful cold start has by definition taken place, the cold start involving each end (exchange end and/or subscriber end) notifying the respective other end of the transmission of specific signals.

The inventive method for transmitting data streams where transmission/reception devices deactivated to a standby state are activated by performing a warm start sequence basically has the following steps:

a) transmission line parameters are determined using an exchange-end transmission/reception device following provision of a subscriber-end transmitted signal;
b) transmission line parameters are determined using a subscriber-end transmission/reception device following provision of an exchange-end transmitted signal;
c) echo cancelation is realigned using a subscriber-end transmission/reception device following provision of a subscriber-end, i.e. its own, transmitted signal; and
d) echo cancelation is realigned using an exchange-end transmission/reception device following provision of an exchange-end, i.e. its own, transmitted signal.

In accordance with one preferred development of the present invention, S(H)DSL activation frames respectively contain two bits per data transmission direction, said bits determining which of the steps a) to d) listed above are performed.

In accordance with another preferred development of the present invention, time periods for signals used to realign echo cancelation are transmitted.

In accordance with yet another preferred development of the present invention, waiting time periods can be prescribed on a variable basis between successive sequences.

Exemplary embodiments of the invention are illustrated in the drawings and are explained in more detail in the description below.

DETAILED DESCRIPTION OF THE INVENTION

Figure 1:
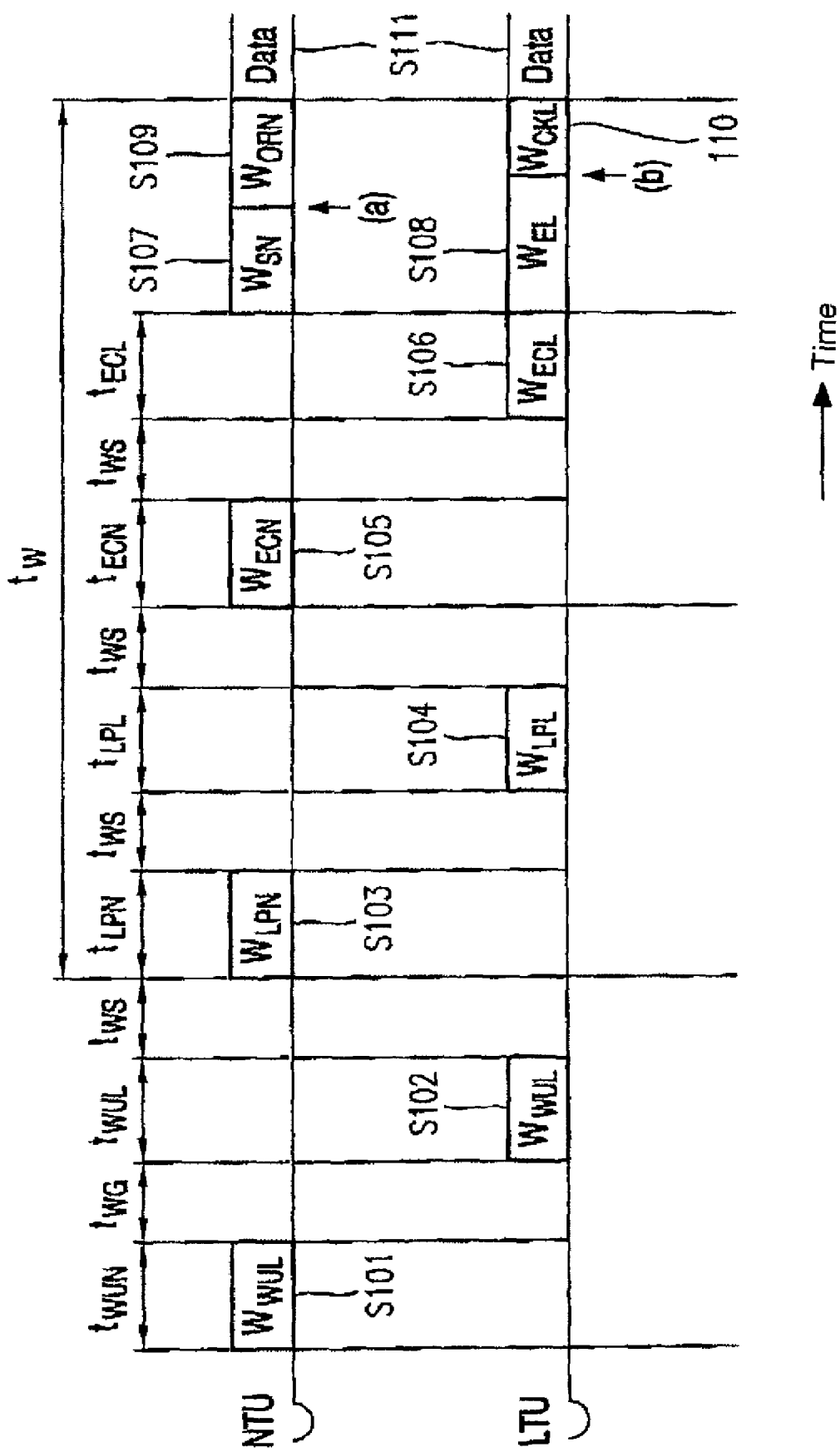
FIG. 1 shows a graphic of a warm start sequence with four additional segments in accordance with an exemplary embodiment of the present invention.

FIG. 1 shows a warm start sequence, with a distinction being drawn between steps performed in an exchange-end transmission/reception device LTU and steps performed in a subscriber-end transmission/reception device NTU.

Normally, a warm start sequence is started from the subscriber end by virtue of a "wake-up signal" being transmitted, whereupon a response is sent by the exchange end using the exchange-end transmission/reception device. It will be pointed out that it is likewise possible for the exchange-end transmission/reception device LTU to provide a "wake-up signal", in which case there is no waiting here for a response from the subscriber-end transmission/reception device NTU.

The individual steps of the warm start sequence shown in FIG. 1 are plotted along a time axis (Time), where individual time-period intervals indicated by double arrows are not necessarily identical, but rather can be of variable length.

In a subscriber-end activation step S101, a subscriber-end "wake-up signal" is transmitted during an activation time $t_{WUN}$ (WUN=Wake-up from NTU, from the subscriber-end transmission/reception device). In the exchange-end activation step S102, the exchange-end transmission/reception device LTU reacts to the signal $W_{WUN}$ with a signal $W_{WUL}$. The next seven time steps are performed on the basis of an exemplary embodiment of the present invention, with a time $t_{WS}$ denoting a prescribable waiting time.

It will be pointed out that, although the waiting times are shown in FIG. 1 as time periods of equal length, the waiting times can assume different time periods.

In accordance with the invention, it is then possible to prescribe whether none or at least one of the steps S103–S106 is performed.

In step S103, subscriber-end transmission line determination is performed, with a signal $W_{LPN}$ being transmitted. In the same way, exchange-end transmission line determination takes place in a step S104, with a signal $W_{LPL}$ being transmitted. The two transmission line determination steps are used for effectively determining the properties of a specific transmission line in the at least one data transmission path for a warm start. It will be pointed out that steps S103–S106 can be performed in any order in accordance with the invention.

On the basis of the invention, which of steps S103–S106 is performed and in what order the steps to be performed are performed are determined most simply by two bits per data transmission direction.

In this context, the invention involves the use of the S(H)DSL activation frame, which contains up to 67 unused bits to be used as follows for an exemplary embodiment of the invention:

1st bit: request for a signal for transmission line determination,
2nd bit: request for a break in transmission in the remote station for the purpose of realigning own echo cancelation;
3rd to 67th bits: not yet used.

It will be pointed out that any other order and arrangement of the bits in the 67-bit-long block of unused bits comes within the scope of the present invention.

As FIG. 1 shows, performance of steps S103 and S104, for example, is followed by a subscriber-end realignment step S105, where an echo cancelation signal $W_{ECN}$ is transmitted during a time period $t_{ECN}$.

This echo cancelation signal is used to perform subscriber-end realignment. A subsequent exchange-end realignment step performs a step which is equivalent to step S105 from the exchange end, i.e. from the exchange-end transmission/reception device LTU.

During a time period $t_{ECL}$, a signal $W_{ECL}$ is transmitted, which means that echo cancelation is performed from the exchange end. Steps S107–S108 correspond to the sequence of a conventional method for transmitting data streams which has been described with reference to FIG. 3. Following step S107, the subscriber-end transmission/reception device is in an operating state, which means that a subsequent subscriber-end acknowledgement step S109 is effected using a signal $W_{OKN}$.

The exchange end performs synchronization in a step S108, with a signal $W_{SL}$ being provided. At a time denoted by an arrow (b) in FIG. 1, both the exchange-end transmission/reception device LTU and the subscriber-end transmission/reception device NTU are in an operating state.

A further, exchange-end acknowledgement step S110 is followed by ordinary data transmission, with both transmission/reception devices being transparent to user data, referred to as data stream transmission step Sill in the exemplary embodiment shown in FIG. 1.

Figure 2:
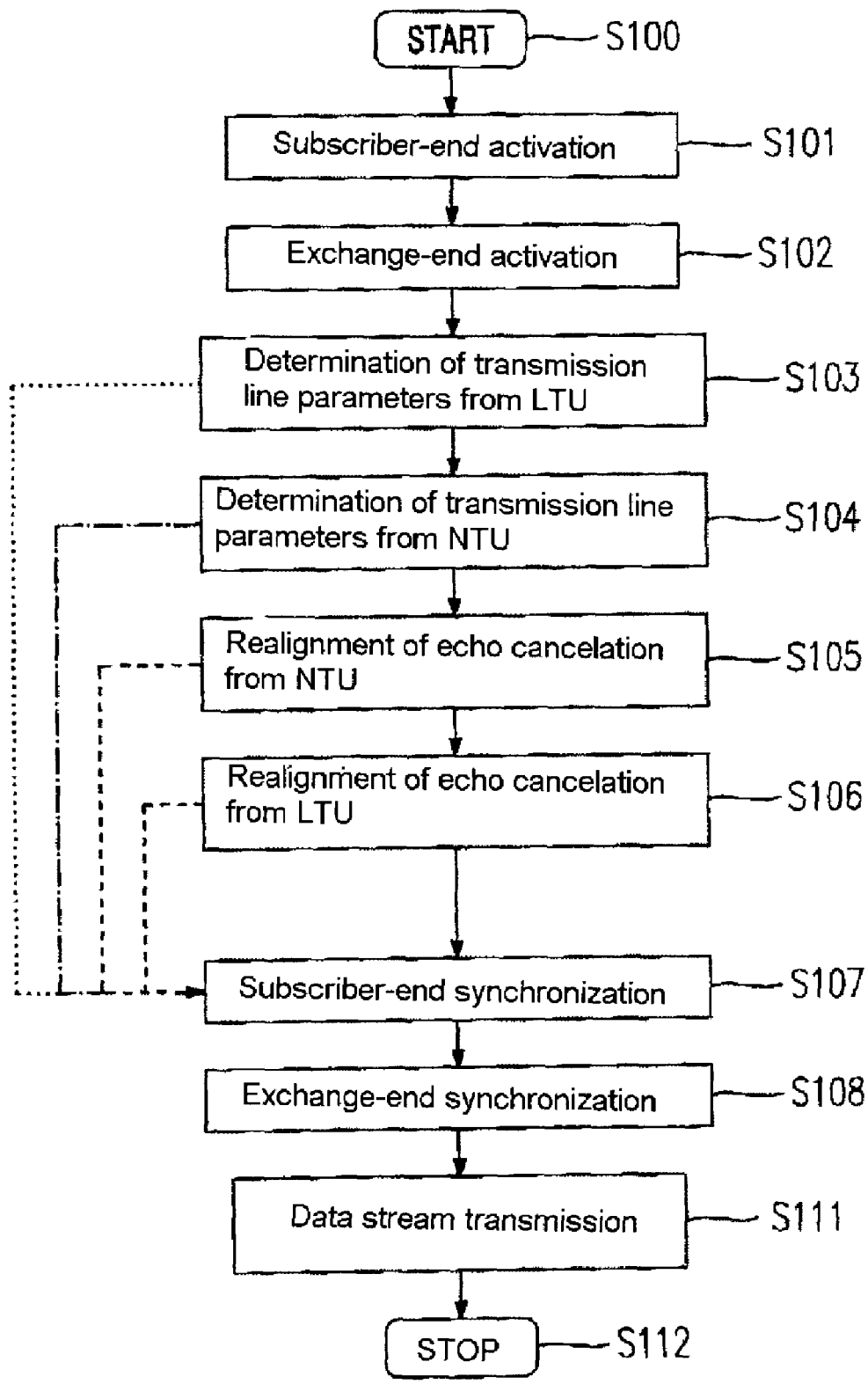
FIG. 2 shows a flowchart for a method for transmitting data streams where transmission/reception devices deactivated to a standby state are activated by performing a warm start sequence in accordance with an exemplary embodiment of the present invention.

FIG. 2 shows a flowchart for an exemplary embodiment of the inventive method for transmitting data streams, where a start step S100 is followed by a subscriber-end activation step S101, and this is followed by an exchange-end activation step S102.

As explained above with reference to FIG. 1, steps S103 to S106 comprise an exchange-end transmission line determination step S103, a subscriber-end transmission line determination step S104, a subscriber-end realignment step S105 and an exchange-end realignment step S106.

The dashed lines routed to the subscriber-end synchronization step S107 illustrate that it is possible to prescribe whether none or at least one of the steps S103–S106 is to be performed, but any order can be used.

Performance of none, one or a plurality of the inventive steps S103–S106 is followed by a subscriber-end synchronization step S107, an exchange-end synchronization step S108 and a data stream transmission step S111, as in methods for transmitting data streams in accordance with the prior art, for example described with reference to FIG. 3.

Data transmission is terminated with a stop step S112.

A considerable economic advantage of the present invention is that a warm start sequence is of very flexible design, with it additionally being possible to determine, in a cold start phase, control by previously unused bits for the segments which are to be performed in the warm start phase. In addition, it is possible to determine a selection of time periods for the segments in the cold start phase.

Figure 3:
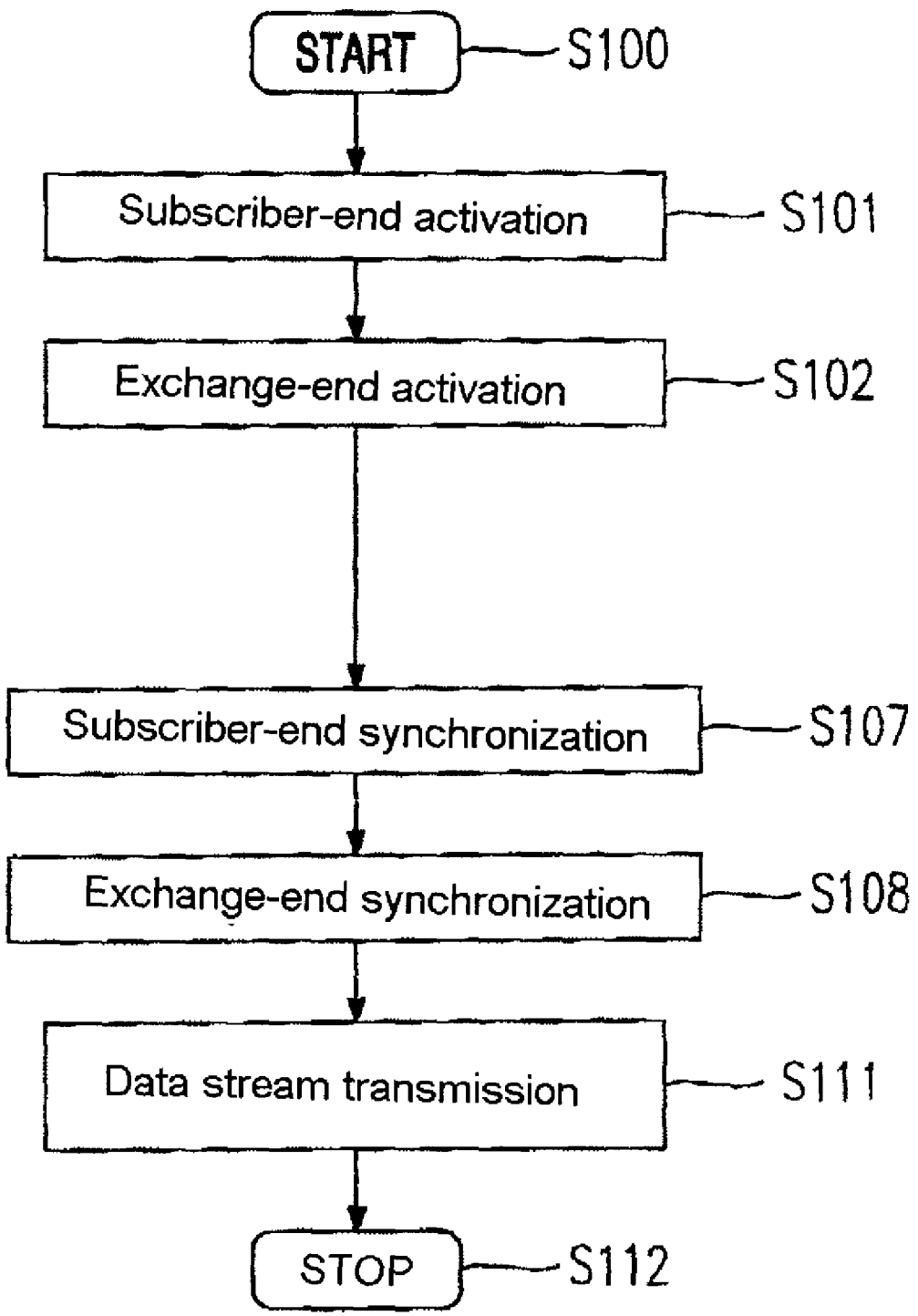
FIG. 3 shows a flowchart for transmission of data streams in a sequence based on the prior art.

With regard to the flowchart shown in FIG. 3 for a conventional method for transmitting data streams, reference is made to the introduction to the description.

Although the present invention has been described above on the basis of preferred exemplary embodiments, it is not limited thereto, but rather can be modified in a variety of ways.

The invention claimed is:

1. Method for transmitting data streams where transmission/reception devices deactivated to a standby state are activated by performing a warm start sequence, with activation at a previous time having determined which of the following steps in the warm start sequence are performed:
   a) determining transmission line parameters using an exchange-end transmission/reception device following provision of a subscriber-end transmitted signal;
   b) determining transmission line parameters using a subscriber-end transmission/reception device following provision of an exchange-end transmitted signal;
      (i) wherein time periods for signals used to determine the transmission line parameters are transmitted during activation at a previous time,
   c) realigning echo cancellation using a subscriber-end transmission/reception device following provision of a subscriber-end transmitted signal; and
   d) realigning echo cancellation using an exchange-end transmission/reception device following provision of an exchange-end transmitted signal;
      (i) wherein time periods for signals used to realign echo cancellation are transmitted during activation at a previous time,
   wherein an activation frame respectively contains at least two bits for each data transmission direction, said bits determining which of the steps a) to d) are performed; and wherein waiting time periods can be prescribed on a variable basis between successive sequences.

* * * * *